United States Patent [19]
Bastasch et al.

[11] Patent Number: 6,042,864
[45] Date of Patent: Mar. 28, 2000

[54] METHOD AND APPARATUS FOR CUTTING BREAD BOWL BAKERY PRODUCTS

[75] Inventors: Paul M. Bastasch; Todd M. Edmunds, both of Overland Park, Kans.; Randyl C. Hanson, Lake Lotawana, Mo.; Scott Lickteig, Lenexa; Eric Scheier, Olathe, both of Kans.

[73] Assignee: United Bakery Equipment Co., Lenexa, Kans.

[21] Appl. No.: 09/100,650

[22] Filed: Jun. 19, 1998

[51] Int. Cl.[7] .............................. A21D 13/00; B26D 5/00
[52] U.S. Cl. .............................. 426/497; 83/209; 83/282; 83/453; 83/932; 426/518
[58] Field of Search ........................... 426/496, 497, 426/518; 99/537; 83/209, 210, 211, 221, 282, 453, 932

[56] References Cited

U.S. PATENT DOCUMENTS

5,060,547  10/1991  Moriya et al. ............................. 83/282
5,775,190   7/1998  Terai ......................................... 83/932

*Primary Examiner*—George C. Yeung
*Attorney, Agent, or Firm*—Shook, Hardy & Bacon, LLP

[57] ABSTRACT

A machine and method for cutting plugs in the tops of baked products which serve as bread bowls when the plugs are removed. The products are conveyed in successive rows to a cutting station where they are stopped and centered beneath a row of cutters by a centering gate and clamped in place by a clamping gate. The cutters are rotated and lowered in unison to cut cylindrical plugs which remain in place on the bakery products for handling and packaging.

18 Claims, 4 Drawing Sheets

METHOD AND APPARATUS FOR CUTTING BREAD BOWL BAKERY PRODUCTS

FIELD OF THE INVENTION

This invention relates generally to what are commonly known as bread bowls which are bakery products provided with open topped cavities that allow them to serve as bowls for holding soup and similar foods. More particularly, the invention is directed to a method and apparatus for cutting plugs in the bakery products so that the soup holding cavity is presented when the plug is removed.

BACKGROUND AND SUMMARY OF THE INVENTION

Bakery products commonly known as bread bowls have achieved considerable popularity. The bread bowl is a baked product similar to a roll which has an open topped cavity for holding soup and similar foods. The plug that is removed to form the cavity is often eaten as a roll that accompanies the soup.

In the past, the plugs have normally been cut by hand at the point of use. The obvious inefficiencies and lack of uniformity resulting from manual cutting of the plugs is evident. However, automated equipment for producing bread bowl products has not been successfully developed.

Accordingly, it is the principal goal of the present invention to provide a method and apparatus for efficiently and reliably cutting plugs in bakery products in order to provide a soup holding cavity when the plug is removed from each product.

More specifically, it is an object of the invention to provide a machine for cutting plugs from bakery products in a manner to take advantage of mass production techniques and efficiencies. In this respect, it is an important feature of the invention that the products are processed simultaneously in rows so that a number of them are conveyed, clamped, cut and then released as a group to provide production efficiencies over processing techniques that involve forming soup cavities one at a time.

Another object in the invention is to provide a method and apparatus of the character described for cutting the plugs in a manner to leave the bottom of each plug attached to the bakery product. Because the product is maintained intact, the bread bowl and plug can be handled and packaged together, and yet the plug can be easily removed at the point of use by tearing it at the bottom.

Still another object of the invention is to provide a method and apparatus of the character described in which the products are securely clamped in place while the plugs are being cut. The plugs are thus cut at the proper location and without damaging the product as could occur if the product is allowed to move during the cutting operation.

A further object of the invention is to provide a method and apparatus of the character described in which the plugs can be cut in virtually any desired shape and to virtually any desired depth. The provision of a cutting assembly in which the cutting blades can be easily removed and replaced by blades of different diameters and/or lengths is important in this regard, as the blade size and length can be varied to vary the size and depth of the bread bowl cavity.

These and other objects are achieved by providing a machine having a conveyor along which the bakery products are conveyed. The conveyor is provided with length-wise partitions so that the products move in side-by-side columns toward a brake mechanism followed by an indexing mechanism. The index station is provided with an indexing gate which intercepts the incoming products. Sensors such as photocells detect when each column has a product located at the index station, and the gate is then raised so that the products are conveyed away side by side in a row toward a cutting station located downstream from the index station.

At the cutting station, a centering gate which is lowered into the conveyor path intercepts and stops the products. The centering gate has, for each product, a pair of angled converging surfaces which center the product side to side at the proper location directly below a hollow cylindrical cutter. The presence of a product at each position in the row located at the cutting station is verified by a photocell or other sensor. A clamping gate then swings down from behind to clamp the products securely against the centering gate.

A cutting assembly carrying all of the cutters is then lowered so that the blades of the cutters penetrate the bakery products all at the same time. The blades are rotated and are provided with cutting teeth on their edges so that the blades cut central cylindrical plugs in the products as they are lowered. Downward motion of the cutting assembly is stopped before the blades cut completely through the bottom of the products, thus leaving the bottom of each plug attached to the product. The cutting assembly is then raised, the centering and clamping gates are swung upwardly to release the products, and the products with the plugs intact are conveyed away for further handling as the next incoming row of products approaches the cutting station.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
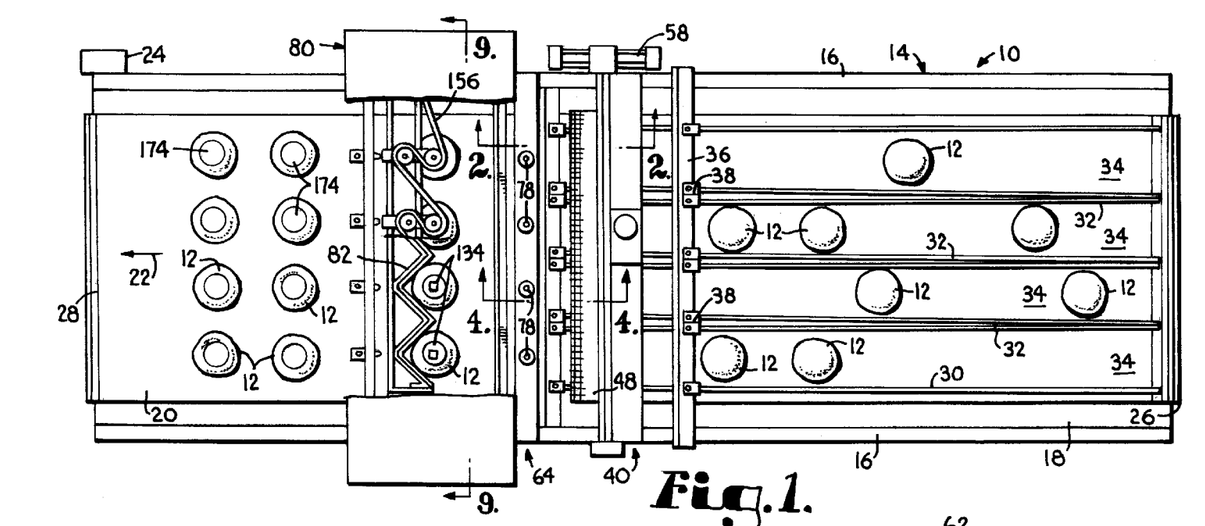
FIG. 1 is a top plan view of a machine constructed to cut plugs in bakery products in a manner to form bread bowls according to a preferred embodiment of the present invention, with portions broken away for purposes of illustration.

Referring now to the drawings in more detail and initially to FIG. 1 in particular, numeral 10 generally designates a machine which is used to cut plugs for forming bread bowl cavities in bakery products 12 which may be in the nature of baked rolls. The machine 10 has a rigid frame which is generally identified by numeral 12. The frame 12 includes legs or similar supports (not shown) for supporting the machine on a floor or other support surface. The frame 14 includes parallel opposite side rails 16 and a horizontal conveyor bed plate 18 which extends between the opposite side rails 16. The upper horizontal run of a flexible conveyor belt 20 is supported on the bed plate 18 and is drawn around rollers (not shown) at the opposite ends of the frame 14. The belt 20 is driven in the direction indicated by the directional arrow 22 by a conventional drive system which is diagrammatically indicated at 24.

The bakery products 12 are loaded onto the machine at an input end 26 of the conveyor belt 20 and, after having plugs cut in them by the machine, are discharged at a discharge end 28 of the conveyor belt 20. The input end portion of the conveyor path defined by movement of the belt 20 is bounded on its opposite sides by sidewalls or guides 30. The conveyor path is partitioned between the opposite sidewalls 30 by a plurality of partitions 32 which divide the conveyor path into a plurality of parallel, side by side columns 34 which extend in a direction longitudinally of the conveyor path. The bakery products 12 are conveyed one behind the other along each column 34 The sidewalls 30 and partitions 32 may be supported on an elevated cross member 36 to which the sidewalls and partitions may be secured by clamps 38.

Figure 2:
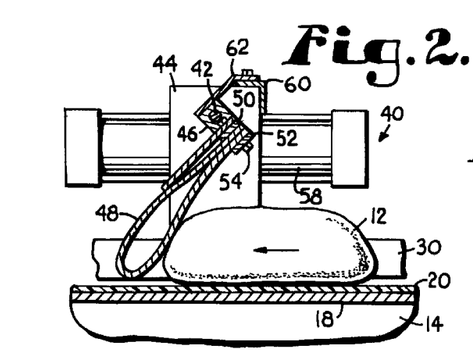
FIG. 2 is a fragmentary sectional view on an enlarged scale taken generally along line 2—2 of FIG. 1 in the direction of the arrows, with the braking gate lowered to effect braking of the bakery products.
Figure 3:
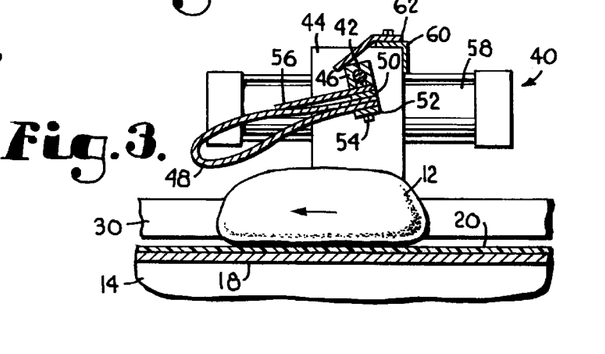
FIG. 3 is a fragmentary sectional view similar to FIG. 2, but showing the braking gate raised to allow passage of the products.

A braking station 40 is provided along the conveyor path a short distance downstream from the bar 36. As best shown in FIGS. 2 and 3, the braking station is provided with a braking mechanism which includes a horizontal shaft 42 extending across the conveyor path at an elevated position between a pair of mounting plates 44. The mounting plates 44 may be suitably secured to the frame 14 to extend upwardly well above the conveyor belt 20. The shaft 42 is axially rotatable and is provided with a square bar 46 that turns with the shaft.

A braking gate 48 is mounted to the shaft 42. The braking gate 48 may be constructed of a flexible material which is arranged in a loop. The upper ends of the braking gate 48 are clamped between a flat bar 50 which is secured to the square bar 56 and another flat bar 52. Bolts 54 or similar fasteners are used to secure the ends of the gate 48 between the bars 50 and 52 and to secure projecting finger plates 56 which are spaced apart to provide backing support for the gate 48. A pneumatic motor 58 is connected with the shaft 42 and may be selectively activated to rotate shaft 42 such that the gate 48 is moved between the braking position shown in FIG. 2 and the release position shown in FIG. 3. In the braking position, gate 48 extends downwardly almost to the conveyor belt 20 and is thus in the path of the products 12 which are conveyed to the braking station 40. In the release position of FIG. 3, gate 48 is raised to allow the products 12 to clear the gate and move away from the braking station 40.

A transverse angle member 60 extends between the plates 44 at their upper edges. A plurality of spaced apart fingers 62 are secured to the angle 60 and are bent to project forwardly and downwardly. When the gate 48 is in the braking position of FIG. 2, the fingers 62 are engaged against a flat surface of the square bar 46. When the gate 48 is raised to the release position of FIG. 3, the fingers 62 engage a corner area of bar 46. Consequently, the fingers 62 urge gate 48 toward the braking position wherein the flat contact between the fingers and bar 46 provides a stable condition.

Figures 4, 5, 6, 7, 10:
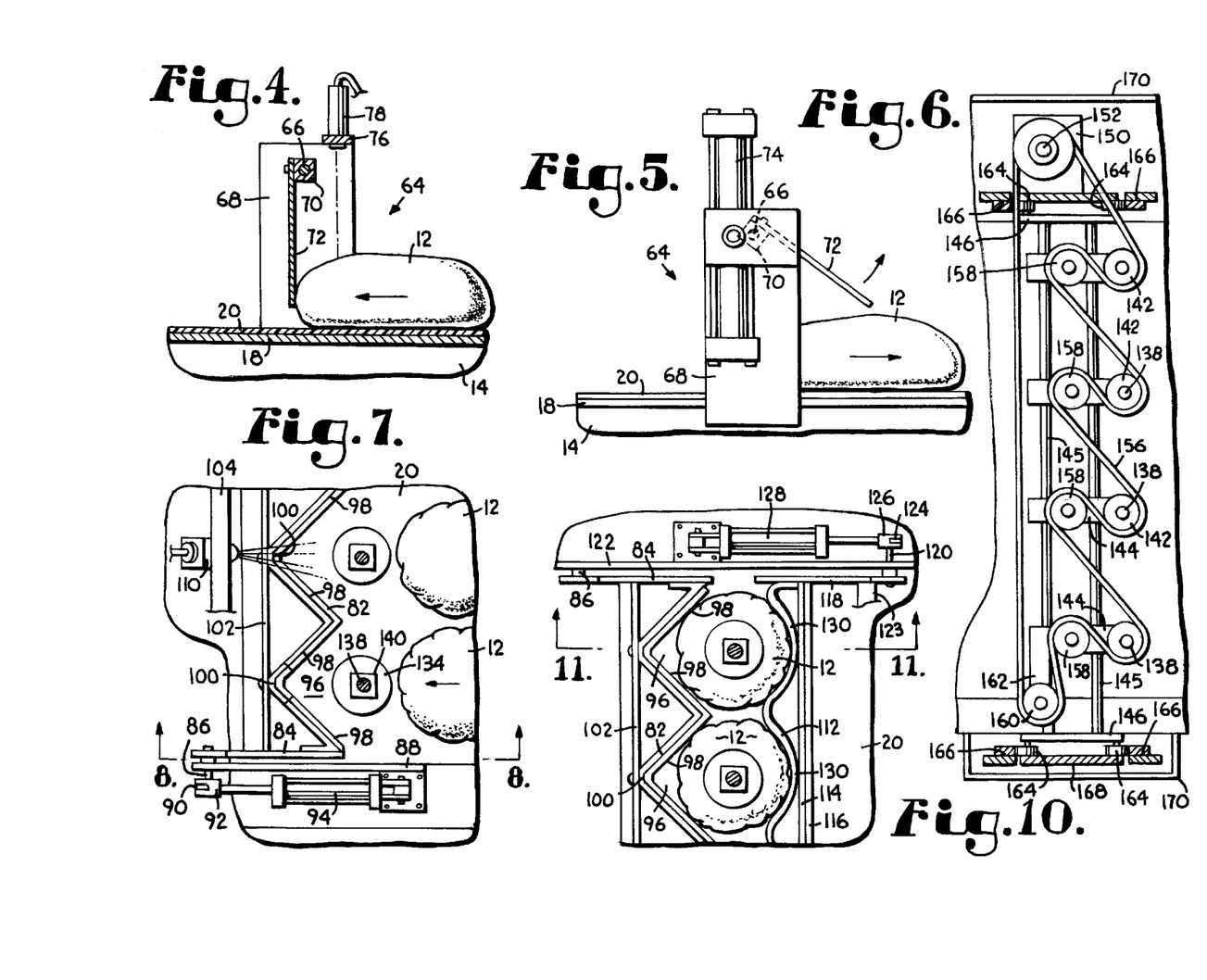
FIG. 4 is a fragmentary sectional view on an enlarged scale taken generally along line 4—4 of FIG. 1 in the direction of the arrows and showing the indexing gate lowered to stop incoming products.
FIG. 5 is a fragmentary sectional view similar to FIG. 4 but taken in the opposite direction and showing the indexing gate raised to release the products for advancement along the conveyor path.
FIG. 6 is a top plan view on an enlarged scale showing the drive system for rotating the cutters of the cutting assembly of the machine.
FIG. 7 is a fragmentary top plan view on an enlarged scale showing the centering gate of the machine in its operating position wherein it is lowered to intercept incoming bakery products.
FIG. 10 is a fragmentary top plan view showing bakery products clamped between the centering gate and clamping gate of the machine.

The machine 10 is provided with an indexing station which is generally identified by numeral 64 in FIG. 1 and which is located a short distance downstream along the conveyor path from the braking station 40. An indexing mechanism which is located at the indexing station 64 is best shown in FIGS. 4 and 5. A transverse horizontal shaft 66 is supported for axial rotation by a pair of mounting plates 68 which are secured to opposite sides of the frame 14. The shaft 66 is provided with a square bar 70 which turns with the shaft and to which an indexing gate 72 is secured. The indexing gate 72 may take the form of a flat plate. The shaft 66 is elevated well above the belt 20.

A pneumatic motor 74 (FIG. 5) is connected with the shaft 66 to rotate the shaft and thereby pivot the indexing gate 72 between the operating or indexing position shown in FIG. 4 and the release position shown in FIG. 5. In the operating or indexing position of the gate 72, the gate extends straight downwardly from the bar 70 to a location near the surface of the conveyor belt 20 such that it intercepts and stops any product 12 which is conveyed against it (see FIG. 4). in the release position of gate 72, the gate is raised upwardly far enough that the products 12 can pass beneath its lower edge and thus move with the belt 20 away from the indexing station 64 (see FIG. 5).

A sensing system is provided at the indexing station 64 to detect the presence or absence of a product at the indexing station in each of the columns 34 of the conveyor path. With reference to FIG. 4 in particular, a mounting bar 76 is secured to extend transversely between the upper edges of the mounting plates 68. A plurality of sensors such as photo detectors 78 are secured to the bar 76. As best shown in FIG. 1, the sensors 78 are spaced apart at locations centered above each of the columns 34 at the location of the indexing station 64. Consequently, at each of the individual article positions corresponding to the columns 34, the presence or absence of an article at the indexing station is detected by the sensing system. The indexing gate 72 is moved to the release position only when each of the article positions at the indexing station is occupied by one of the articles bearing against the gate 72 in each of the columns 34.

It is to be understood that sensors other than the photo sensors 78 may be used and that, while four columns 34 are shown in FIG. 1, virtually any desired number of columns can be provided. It is also noted that the partitions 32 do not extend through the braking station 40 or the indexing station 64 so that the braking and indexing functions can be performed by a single braking gate 38 and a single indexing gate 62 which are effective as to the products 12 in all of the columns 34.

Figures 8, 9, 11, 12:
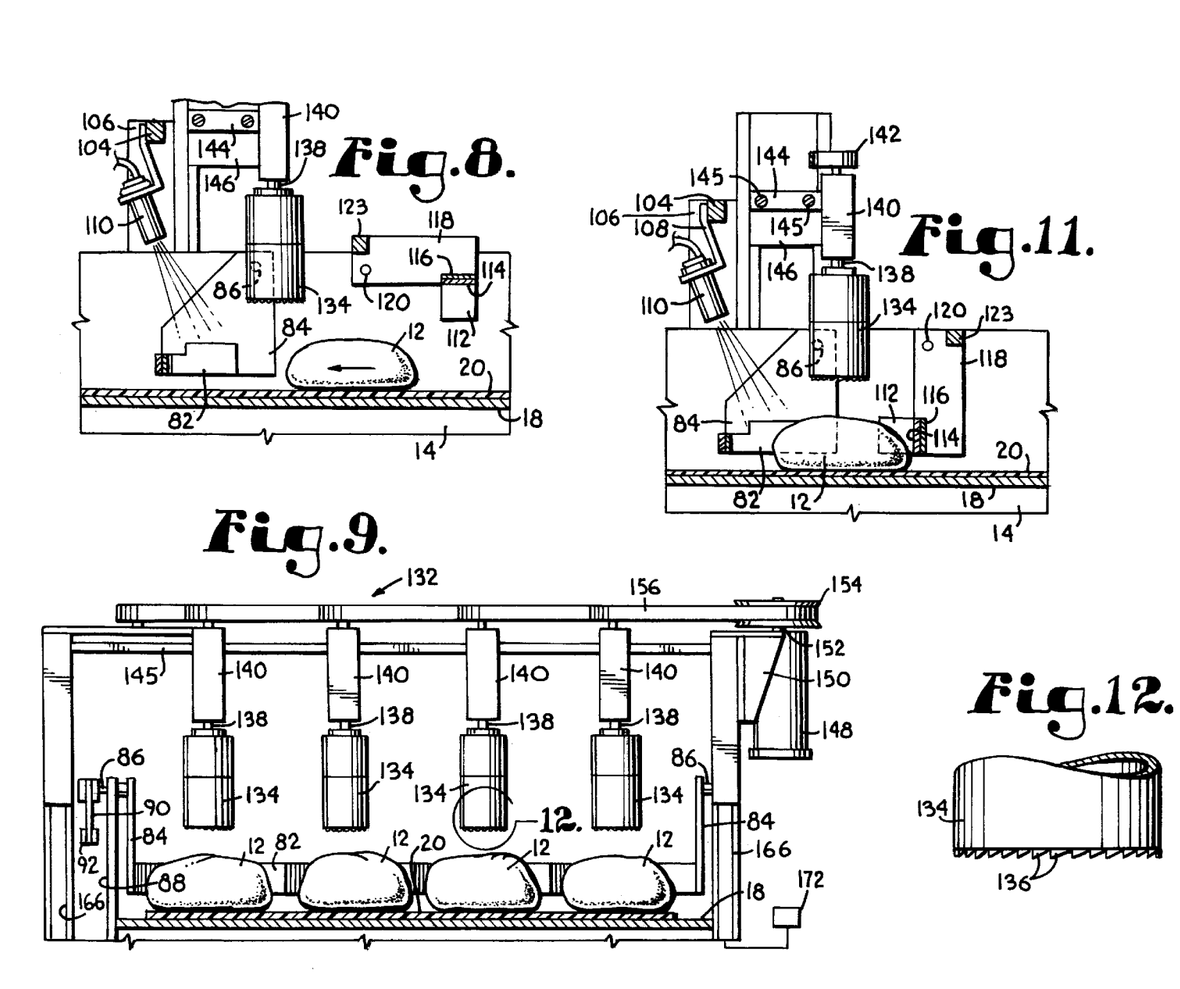
FIG. 8 is a fragmentary sectional view taken generally along line 8—8 of FIG. 7 in the direction of the arrows.
FIG. 9 is a fragmentary sectional view on an enlarged scale taken generally along line 9—9 of FIG. 1 in the direction of the arrows, with the cutting assembly raised to locate the cutters above the underlying bakery products.
FIG. 11 is a fragmentary sectional view taken generally along line 11—11 of FIG. 10 in the direction of the arrows.
FIG. 12 is a fragmentary elevational view on an enlarged scale of detail 12 depicted in FIG. 9.

A cutting station which is generally identified by numeral 80 in FIG. 1 is provided on the machine at a location downstream from the indexing station 64. At the cutting station 80, a centering mechanism acts to intercept and stop the bakery products 12 and to center them at the proper side-to-side locations for the plug cutting operation. With particular reference to FIGS. 8 and 9, the centering mechanism includes a centering gate 82 connected at its opposite ends with a pair of bracket plates 84. The bracket plates 84 carry horizontal pins 86 which are axially aligned with one another and are mounted to pivot on mounting plates 88 secured to the frame of the machine. One of the pins 86 is secured to one end of a crank arm 90 having its other end pinned to a device 92 which is carried on the piston rod of a pneumatic cylinder 94 (FIG. 7). By this arrangement, the cylinder 94 can be extended and retracted to pivot the centering gate 82 about the horizontal axis of pins 86 between the operating position shown in FIGS. 8 and 9 and the release position shown in FIG. 15. In the operating position, the gate 82 is lowered to a position slightly above the conveyor belt 20 where the gate is positioned to intercept and stop the bakery products 12 which are conveyed to the cutting station 80. In the release position of the centering gate 82, the gate is raised and released from the products 12 so that the products can be advanced along the conveyor path.

The configuration of the centering gate 82 is best shown in FIGS. 7 and 10. The gate 82 is bent in a zig-zag shape providing four side-by-side pockets 96 which are spaced apart to define a straight row for the receipt of four of the products 12 at the cutting station 80 (one product for each column 34). Each pocket 96 is defined generally between a pair of angled guide surfaces 98 which are provided on the gate 82. The guide surfaces 98 in each pair converge in a direction downstream along the conveyor path and are joined at vertexes 100. Each pair of surfaces 98 forms the general shape of a V. The gate 82 includes a backing plate 102 which is connected with the vertexes 102 and which is connected at its opposite ends with the end plates 84. The surfaces 98 located adjacent to the end plates 84 are suitably connected to the end plates.

The converging V shaped arrangement of the guide surfaces 98 centers each of the bakery products 12 the proper side-to-side location in the corresponding pocket 96. The products 12 are conveyed until they contact one of the surfaces 98, and the product then slides along the surface 98 which is first contacted until it is also disposed against the other surface 98, thus centering the product so that it can be accurately cut in a manner that will be explained more fully.

The machine 10 is equipped with a sensing system which senses the presence or absence of a product at each of the locations defined by the pockets 96. As best shown in FIGS. 8 and 11, a mounting bar 104 is secured at its opposite end to mounting plates 106 which are in turn secured to the frame of the machine. A plurality of brackets 108 are secured at spaced apart locations to the bar 104 and are equipped with sensing devices such as photo sensors 110. Each of the sensors 110 is located to monitor one of the pockets 96 and to detect the presence or absence of a bakery product 12 in the pocket. As best shown in FIG. 1, one of the sensors 110 is provided for each pocket 96.

The cutting station 80 is equipped with a clamping gate which is identified by numeral 112 in FIGS. 8 and 11. The clamping gate 112 is secured to a backing plate 114 which is in turn secured to another plate 116 extending between a pair of end plates 118. With reference additionally to FIG. 10, the plates 118 are provided with axially aligned pins 120 which are mounted to rotate on mounting plates 122 secured to the machine frame 14. A stiffener bar 123 extends between the end plates 118. The pins 120 provide a horizontal axis about which gate 112 may be pivoted.

With continued reference to FIG. 10 in particular, one of the pins 120 is connected with one end of a crank arm 124 having its opposite end pivoted to a device 126 carried on the piston rod of a pneumatic cylinder 128. This crank mechanism effects pivoting of the clamping gate 112 between the clamping position shown in FIG. 11 and the release position shown in FIG. 8 when the cylinder 128 is extended and retracted. In the clamping position of gate 118, the gate presses against the trailing end portions of the products 12 which are positioned against the centering gate 82 at the cutting station of the machine. In the release position of gate 112 shown in FIG. 8, the clamping gate is raised to allow incoming articles 12 to pass beneath it toward the centering gate 82.

The configuration of the clamping gate 112 is best shown in FIG. 10. Gate 112 takes the form of a plurality of side-by-side arcs 130 which are connected to one another and which provide cups that are curved to generally conform with the shapes of the bakery products 12. One of the arcs 130 is provided for each of the columns 34, and the arcs 130 are located to oppose the guide surfaces 98 on the centering gate 82. The clamping gate 112 is lowered against the products 12 from behind and clamps them in place in the pockets 96, with the arcs 130 pressing against the products 12 from behind to securely retain the articles against the guide surfaces 98 in front.

Figures 13, 14, 15, 16:
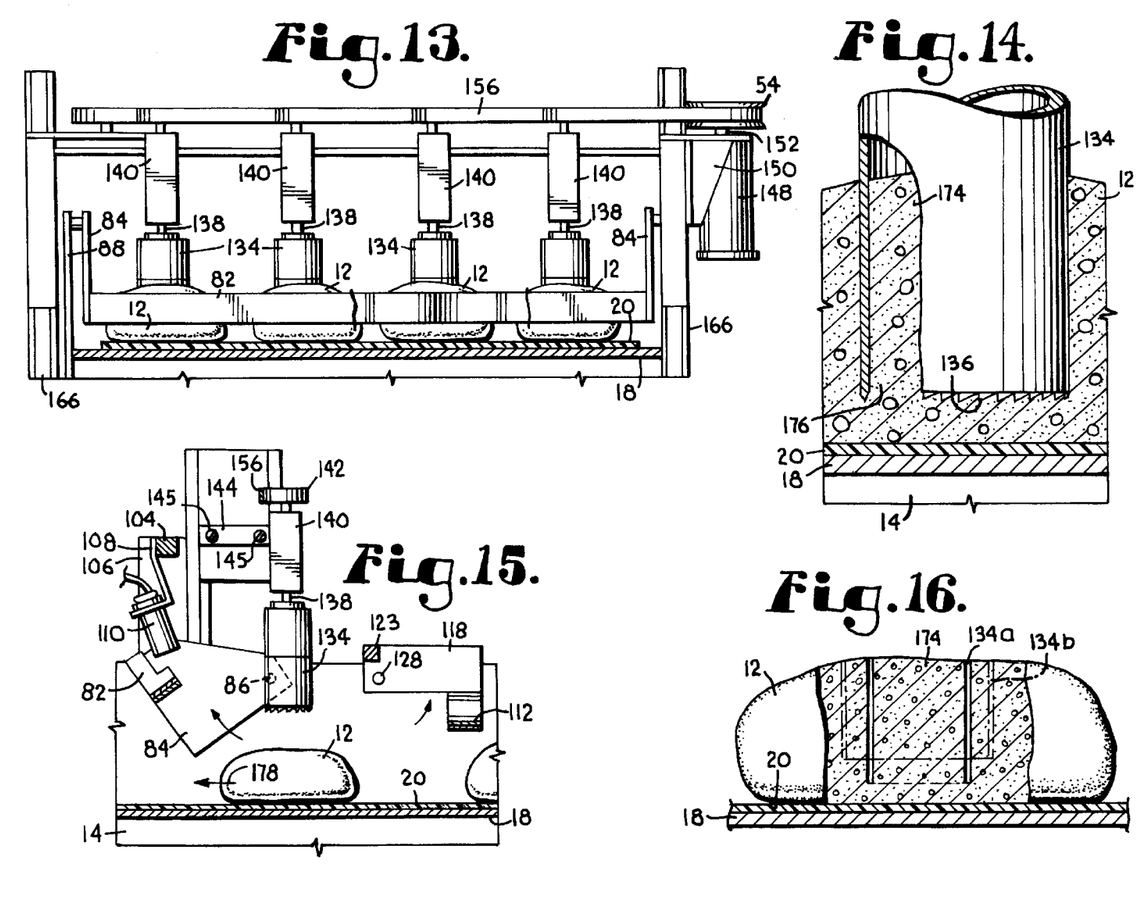
FIG. 13 is an elevational view similar to FIG. 9, but showing the cutting assembly lowered for penetration of the cutters into the bakery products to cut plugs therein.
FIG. 14 is a fragmentary elevational view on an enlarged scale showing the penetration of a cutter into one of the bakery products, with a portion of the cutting blade broken away.
FIG. 15 is a fragmentary sectional view similar to FIG. 8, but showing the centering and clamping gates swung upwardly to release them from a food product in which a plug has been cut.
FIG. 16 is a fragmentary elevational view showing how different cutters can be used to cut soup bowl cavities of different sizes and depths.

The machine 10 is equipped at the cutting station 80 with a cutting assembly which is generally identified by numeral 132 in FIGS. 9 and 13. The cutting assembly 132 includes a plurality of individual cutters 134 which are spaced apart across the width of the machine. The cutters 134 take the form of hollow cylindrical cutting blades having sharp teeth 136 (FIGS. 12 and 14) on the circular lower cutting edges of the blades. Each of the cutters 134 is mounted centrally on the lower end of a vertical shaft 138 which extends through and is supported for rotation on a bearing block 140. A pulley 142 (see FIG. 6) is mounted on the top end of each shaft 138 at a location above the bearing block 140. With continued reference to FIG. 6 in particular, a slide block 144 is secured to one side of each of the bearing blocks 140. The slide blocks 145 are mounted on a pair of horizontal rods 144 which extend transversely across the machine between a pair of end plates 146. The slide blocks 144 can be adjusted along the length of the rods 145 in order to center the cutters 134 directly above the products 12 which are clamped in the pockets 96. Set screws or similar devices (not shown) can be used to fix the slide blocks 144 in place on rods 145 when they have been adjusted to the desired positions.

The cutters 134 are driven about the vertical axes provided by the shafts 138 by a drive system which includes a drive motor 148 (see FIGS. 9 and 13). The motor 148 is mounted on a bracket 150 secured to the frame. The motor 148 drives a vertical output shaft 152 (FIG. 9) which carries a pulley 154 on its top end. As best shown in FIG. 6, a drive belt 156 is drawn around pulley 154, around the pulleys 142, and also around the plurality of idler pulleys 158 which are mounted on top of the slide blocks 144 to turn on vertical stub shafts 159. A tensioning pulley 160 is mounted on a plate 162 secured to one of the end slide blocks 144 and receives the drive belt 156. The pulley 160 can be adjusted in position to attain the desired tension of the drive belt 156. Motor 148 drives the belt 156 which in turn rotates all of the cutters 134 through pulleys 142 and shafts 138.

The cutting assembly 132 is mounted on the frame 14 of the machine for up and down movement to lower the cutters 134 toward the underlying bakery products 12 and to withdraw the blades from the products after plugs have been cut therein. As shown in FIG. 6, the end plates 146 are each provided with a plurality of rollers 164 which may be four in number on each plate 146. The rollers 164 ride upwardly and downwardly along a vertical track provided by vertical bars 166 secured to the frame of the machine. Guide plates 168 prevent the rollers 164 from rolling off of the track. The track and rollers may be enclosed within covers 170 secured to the frame of the machine.

A suitable drive mechanism which is generally identified by numeral 172 in FIG. 9 is used to selectively move the cutting assembly 132 upwardly and downwardly along the path provided by the vertical tracks 166. The drive system 172 moves all of the cutters 134 simultaneously between the raised position shown in FIG. 9 and the lowered or cutting position shown in FIG. 13. In the raised position, the cutters 134 are raised above and centered directly on the products 12 which are clamped in the pockets 96. In the cutting position of FIG. 13, the cutters 134 are lowered to a position near but spaced slightly above the conveyor belt 20 (see FIG. 14) to cut a cylindrical plug 174 (FIG. 1) in the center of each product 12. The drive system 172 may be of any suitable type such as a crank type mechanism powered by a drive motor or other prime mover.

In operation of the machine 10, the bakery products 12 are loaded onto the input end 26 of the conveyor and are conveyed by belt 20 along the columns 34 one behind the other to the braking station 40 which acts to brake the advancement of the products. The products are then conveyed by belt 20 to the indexing station 64 where they are intercepted and stopped by the indexing gate 72 which is then in the operating position shown in FIG. 4. When the sensors 78 detect the presence of an article 12 at the indexing station in each of the columns 34, the indexing gate 72 is raised to the release position of FIG. 5, and the articles 12 are then conveyed from the indexing station 64 to the cutting station 80. The articles are conveyed away from the indexing station side by side in a substantially straight transverse row which contains one product for each column 34 (four articles per row in the exemplary machine shown in FIG. 1).

When the products 12 approach the cutting station 80, the centering gate 82 is lowered to its operating position which is the position shown in FIG. 8. The clamping gate 112 is in its release position (FIG. 8) so that the bakery products are able to clear it and approach the clamping gate 112. The clamping gate 112 intercepts and stops the products 12, with the guides surfaces 98 assuring that the products are centered sidewall in the pockets 96 as previously described. The sensors 110 assure that there is one of the articles 12 in each of the pockets 96. And the clamping gate 112 is then pivoted downwardly to the clamping position shown in FIG. 10. The products 12 are then securely clamped in place at centered positions in the pockets 96 and are securely held in place at centered locations directly beneath the cutters 134.

The cutters 134 are all rotated in unison by the drive motor 148 and drive belt 156, and the cutting assembly 132 is lowered from the position of FIG. 9 to the cutting position shown in FIG. 13. The cutting edges which carry the teeth 136 penetrate and cut the products 12 from the tops thereof and progressively cut the cylindrical plugs 174 as the blades are lowered into the products. Each of the blades 134 is lowered to the position which is shown in FIG. 14 for one of the cutters 134. The lower cutting edge which carries the teeth 136 is located a short distance above the belt 20 and thus above the bottom surface of the product 12. After this position of the cutters 134 has been reached, the cutting assembly 132 is raised to the position of FIG. 9 to withdraw the cutters 134 from the products 12, thus leaving the plugs 174 intact and connected with the products 12 at the bottom end portion 176 (FIG. 14) of each plug 174.

After the cutting operation has been completed and the cutters 134 have been withdrawn from the articles, the centering gate 82 and the clamping gate 112 are raised to their release positions, as shown in FIG. 15. The articles 112 are then released from the cutting station and are conveyed in a downstream direction as indicated by the directional arrow 178 in FIG. 15. As shown in FIG. 1, the products 12 with the plugs 174 intact are conveyed to the discharge end 28 of the convener.

The centering blade 82 is lowered to its operating position as soon as a row of products has been conveyed away from the cutting station, thus placing gate 82 in a position to receive the next row of articles that are released by gate 72 at the indexing station. The products 12 are successively processed in rows in this fashion to cut the plugs 174.

The products 12 with the intact plugs 174 can be handled and packaged together, and the plug 174 can be torn out of the center of each product at the point of use to provide an open-topped cavity for receiving soup or a similar flowable food. The plug 174 can be eaten as a roll to accompany the material contained within the bread bowl which is provided by the product 12.

It is noted that the cutters 134 can be removed and replaced by cutters having a different size and/or depth. For example, FIG. 16 depicts one cutting blade 134a that has a relatively small diameter and a relatively long length. An alternative cutting blade 134b has a somewhat greater diameter and a lesser length to cut a plug that is somewhat larger and shallower than the plug that is cut by the other blade 134a. Blades having virtually any desired size and configuration can be used with the machine.

From the foregoing it will be seen that this invention is one well adapted to attain all ends and objects hereinabove set forth together with the other advantages which are obvious and which are inherent to the structure.

It will be understood that certain features and sub combinations are of utility and may be employed without reference to other features and sub combinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. Apparatus for cutting a bakery food article to provide a cavity therein for holding flowable food such as soup, said apparatus comprising:

a frame providing a conveyor for conveying the article along a conveyor path;

a centering element mounted along the conveyor path for movement between an operating position wherein said element is situated to intercept and stop the article at a preselected location and a release position wherein the article can move past said element along the conveyor path;

a clamping element mounted along the conveyor path for movement between a clamping position wherein an article intercepted by said centering element is clamped thereto by the clamping element to secure the article in said preselected location, and a release position wherein the clamping element releases from the article;

a cutter mounted adjacent to said preselected location for generally up and down movement between a raised position wherein the cutter is above an article situated at said preselected location and a cutting position wherein the cutter is adapted to penetrate the article and cut a plug therein from the top with the plug being removable to present an open topped cavity in the article for holding the flowable food;

a power mechanism operable to move said centering element to the operating position thereof to intercept and stop successive incoming articles at said preselected location, and to the release position thereof after said plug has been cut and said cutter has been moved to the raised position;

a power mechanism operable to move said clamping element to the clamping position each time an article has been intercepted and stopped at said preselected location by said centering element, and to the release position thereof after said plug has been cut; and a power mechanism for moving said cutter to the cutting position thereof each time an article is clamped to said centering element by said clamping element, and to the raised position thereof after said plug has been cut.

2. Apparatus for cutting bakery food articles to provide a cavity in each article for holding flowable food such as soup, said apparatus comprising:

a frame providing a conveyor for conveying the articles generally side by side along a conveyor path;

a centering gate mounted along the conveyor path for movement between an operating position and a release position, said gate in the operating position thereof being situated to intercept and stop a plurality of articles generally side by side along said conveyor path at a cutting station and said gate in the release position thereof releasing the articles for movement thereof away from the cutting station;

a power mechanism selectively moving said centering gate between the operating and release positions thereof;

a clamping gate mounted along the conveyor path for movement between a clamping position and a release position, said clamping gate in the clamping position thereof acting to clamp a plurality of articles generally side by side against said centering gate at said cutting station and said clamping gate in the release position thereof releasing from the articles;

a power mechanism selectively moving said clamping gate between the clamping and release positions thereof;

a cutter assembly at said cutting station including a plurality of individual cutters spaced apart sidewall to substantially correspond with the spacing between articles clamped between said centering and clamping gates; and a power mechanism selectively raising and lowering said cutter assembly to effect penetration of the cutters into the articles at said cutting station to cut plugs therein which are removable to present open topped cavities in the articles for holding the flowable food.

3. Apparatus as set forth in claim 2, including:

a plurality of side by side longitudinal columns on said conveyor along which articles are conveyed one behind another;

an index station along said conveyor path upstream from said cutting station;

an indexing gate mounted adjacent to said index station for movement between a blocking position wherein said indexing gate stops and intercepts the articles in each column at said index station, and a release position wherein the articles are conveyed away from said index station toward said cutting station;

a sensor at said index station detecting the presence or absence of an article in each column at the index station; and a power mechanism operable to move the indexing gate to the release position thereof when an article is present at the index station in each column, and to the blocking position after the articles have been conveyed away from the index station.

4. Apparatus as set forth in claim 2, including:

surfaces on said centering gate arranged and situated to establish a plurality of preselected positions of the articles generally side by side in a transverse row at said cutting station; and a sensor operable to detect the presence or absence of an article at each of said preselected positions, said power mechanism for the cutter assembly being disabled to prevent lowering the cutter assembly unless an article is present at each of said preselected positions.

5. Apparatus as set forth in claim 4, wherein said surfaces comprise a pair of guide surfaces for each of said preselected positions arranged to receive incoming articles and angled to converge in a direction downstream relative to the conveyor path to locate each article at said preselected position thereof when the article is engaged by both of the guide surfaces.

6. Apparatus as set forth in claim 5, wherein each of said individual cutters comprises a blade having an edge for penetrating the article.

7. Apparatus as set forth in claim 5, wherein each of said individual cutters comprises a blade having a substantially circular edge for penetrating the article, each blade being rotated as it is being lowered to penetrate the article.

8. Apparatus as set forth in claim 7, wherein each blade is lowered to penetrate less than the full depth of the article to maintain said plug attached at the bottom thereof to the article.

9. Apparatus as set forth in claim 2, wherein each of said individual cutters comprises a blade having a substantially circular edge for penetrating the article, each blade being rotated as it is being lowered to penetrate the article.

10. Apparatus as set forth in claim 9, wherein each blade is lowered to penetrate less than the full depth of the article to maintain said plug attached at the bottom thereof to the article.

11. Apparatus as set forth in claim 2, wherein said centering gate is mounted for pivotal movement between the operating and release positions thereof.

12. Apparatus as set forth in claim 2, wherein said clamping gate is mounted for pivotal movement between the clamping and release positions thereof.

13. A method of cutting a plug in a bakery food article to provide a cavity in the article for holding flowable food such as soup when the plug is removed, said method comprising:

advancing the article along a path to a cutting station;

positioning a centering element in the path of the article to stop the article at said cutting station;

applying a clamping force to the article from behind to clamp the article in a fixed position against the centering element;

cutting a plug in the article from the top while the article is clamped in said fixed position;

withdrawing said centering element from the path of the article; and advancing the article away from said cutting station with the plug in the article.

14. The method as set forth in Claim 13 wherein the step of cutting a plug in the article comprises cutting the plug therein to a depth above the bottom of the article to leave the plug attached to the article.

15. The method as set forth in claim 13, wherein the step of cutting a plug in the article comprises lowering a substantially circular cutting edge into the article while rotating said cutting edge.

16. A method of cutting plugs in bakery food articles to provide cavities in the articles for holding flowable food such as soup when the plugs are removed, said method comprising:

advancing a plurality of the articles along a path generally side by side in a row oriented transverse to the direction of advancement;

positioning a centering gate in the path of the articles at a cutting station to intercept and stop the articles in side by side positions at the cutting station;

applying a clamping gate to the articles from behind to clamp each article against the centering gate in a fixed position at the cutting station;

applying a plurality of cutting blades to the articles from the top substantially simultaneously to cut a plug in each article while the articles are clamped in said fixed positions;

withdrawing the cutting blades from the articles while leaving said plugs therein;

removing the centering gate from the path of the articles after the blades have been withdrawn; and conveying the articles away from the cutting station with the plugs in the articles.

17. The method as set forth in claim 16, wherein the step of applying a plurality of cutting blades to the articles comprises:

lowering each blade into the corresponding article; and rotating each blade as it is being lowered.

18. The method as set forth in claim 17, including the step of terminating the lowering of each blade prior to penetration thereof to the bottom of the corresponding article to thereby maintain the plugs attached at the bottoms thereof to the articles.

* * * * *